United States Patent Office 3,423,457
Patented Jan. 21, 1969

3,423,457
SUBSTITUTION PRODUCTS OF 7-CHLORO-6-
DEMETHYLTETRACYCLINE
Robert Winterbottom, New City, and Martin Leon Sas-
siver, Pearl River, N.Y., assignors to American Cyana-
mid Company, Stamford, Conn., a corporation of
Maine
No Drawing. Continuation-in-part of application Ser.
No. 322,521, Nov. 8, 1963. This application Nov.
29, 1966, Ser. No. 597,565
U.S. Cl. 260—559         2 Claims
Int. Cl. C07c 103/19

ABSTRACT OF THE DISCLOSURE

This disclosure describes a process of preparing 9-nitro-7-chloro-6-demethyltetracycline by the direct nitration of 7 - chloro - 6 - demethyltetracycline at a temperature not higher than −30° C.

---

This application is a continuation-in-part of our co-pending application Ser. No. 322,521 filed Nov. 8, 1963 and now abandoned.

This invention relates to a novel process of preparing 7-chloro-6-demethyl-9-nitrotetracycline in the formula:

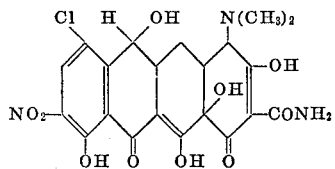

The nitration of the broad-spectrum antibiotics 6-deoxytetracycline and 6-demethyl-6-deoxytetracycline under strongly acidic conditions to produce 7- and/or 9-nitro-6-deoxytetracycline and- 7- and/or 9-nitro-6-demethyl-6-deoxytetracycline has been described by Boothe et al. in the Journal of the American Chemical Society 82, 1253 (1960). The resulting nitrotetracyclines are highly active antibiotics. Chemical modification by substitution of the D-ring of a compound having the tetracycline nucleus without other alteration of the molecule, however, has hitherto only been successful with the synthetic 6-deoxytetracyclines. Efforts to apply this nitration reaction to the naturally-occurring tetracyclines, that is those having a hydroxyl group in the 6-position, have been unsuccessful because the conventional nitration conditions with potassium nitrate and concentrated sulfuric acid at 0° C. cause a rapid dehydration across the 5a,6-position of the tetracycline molecule to produce the relatively inactive anhydrotetracyclines.

Surprisingly, in accordance with the present invention we have discovered that by a critical modification of the nitration conditions it is possible for the first time to obtain direct substitution in the D-ring of a naturally-occurring tetracycline molecule containing the 6-hydroxyl group without otherwise altering the molecule by dehydration. Thus, the present invention makes it possible for the first time to produce new 9-substituted demethyltetracyclines.

We use as the starting material for the preparation of the new compounds 7-chloro-6-demethyltetracycline which is produced by cultivation of a mutant of *Streptomyces aureofaciens* in an aqueous nutrient medium under submerged aerobic conditions. This compound and a process for producing the same are described in the McCormick et al. Patent No. 2,878,289.

We have found that by subjecting this compound to nitration at a temperature not higher than −30° C., the compound can be nitrated to produce 7-chloro-6-demethyl-9-nitrotetracyclines without a simultaneous dehydration of the molecule.

In carrying out the present invention, 7-chloro-6-demethyltetracycline is dissolved in an organic solvent such as dimethylformamide. The reason for using a solvent is to lower the freezing point of the sulfuric acid so that the reaction mixture remains liquid at −30° C. This solution is pre-cooled to about −30° C. and added to a 20:1 mixture of concentrated sulfuric acid and water which has been cooled to and maintained at a temperature of at least −30° C. Reaction at a temperature as high as −20° C. produces an approximately equal mixture of the desired 7-chloro-6-demethyl-9-nitrotetracycline and the undesired 5a,6-anhydro compound. Reaction at 0° C. produces almost exclusively the 5a,6-anhydro compound. Then a solution of potassium nitrate in concentrated sulfuric acid is added dropwise. After the addition is complete, the reaction mixture is held at not greater than −30° C. for about 15 minutes and is then poured slowly into a suitable quantity of chopped ice. The solution is then extracted with four 500 milliliter volumes of n-butanol. The pooled butanol extract is adjusted to a pH of about 0.5 with an aqueous inorganic base such as ammonium hydroxide. The resulting aqueous phase is discarded and the n-butanol phase is washed with water. The washed n-butanol extract is then vacuum concentrated to a small volume, the product is collected, washed with ethyl ether and then dried yielding 7-chloro-6-demethyl-9-nitrotetracycline as the hydrogen sulfate salt. This product may be catalytically reduced to 9-amino-7-chloro-6-demethyltetracycline by following the hydrogenation procedure described in the aforesaid Journal article, or it may be reductively dehalogenated to give 9-amino-6-demethyltetracycline as described in United States Patent to McCormick No. 2,731,497.

The compounds 7-chloro-6-demethyl-9-nitrotetracycline and 9-amino-7-chloro-6-demethyltetracycline are intermediates for the preparation of other tetracycline derivatives such as 9-amino-6-demethyl-6-deoxytetracycline described in the aforesaid Journal article, and certain N-acylated tetracyclines wherein the 9-amino group can be transformed into a diazonium group by procedures well known to the art.

The 7-chloro-9-substituted-6-demethyltetracyclines are biologically active and possess the broad-spectrum antibacterial activity of the previously known tetracyclines. The following table illustrates the antibacterial spectrum of 9-amino-7-chloro-6-demethyltetracycline. For comparison purposes, 7-chlorotetracycline is used having an activity of 1000. When tetracycline is used as the reference compound the activity values of 9-amino-7-chloro-6-demethyltetracycline are approximately four times greater.

TABLE I

| Organism: | Activity |
|---|---|
| *Staphylococcus aureus* ATCC 6548P | 500 |
| *Streptococcus faecalis* ATCC 8043 | 250 |
| *Bacillus subtilis* ATCC 6633 | 125 |
| *Proteus vulgaris* ATCC 9484 | 265 |
| *Escherichia coli* ATCC 9637 | 530 |
| *Salmonella Gallinarum* Led. An. Ind. 604 | 500 |
| *Mycobacterium smegmatis* ATCC 607 | 500 |

The following table illustrates the in vivo activity of 9-amino-7-chloro-6-demethyltetracycline and 7-chloro-6-demethyl-9-nitrotetracycline as compared with tetracycline hydrochloride. The animals used were female mice weighing 20–24 grams. The infection was produced by intraperitoneal injection of 0.5 ml. of a $10^{-2}$ trypticase soy broth dilution of a five hour broth culture of *Staphylococcus aureus* strain Smith 15 ± 2×10⁶ units. The mortality rate for non-treated infected control mice was 97% (58/60) with an average survival time of 1.0–1.3 days.

Treatment was made by single intravenous dose at the levels indicated.

TABLE II.—ALIVE/TOTAL 14 DAYS AFTER INFECTION

| Doses in mg./kg. | Tetracycline HCl | 9-amino-7-chloro-6-demethyltetracycline | 7-chloro-6-demethyl-9-nitrotetracycline |
| --- | --- | --- | --- |
| 16 | | 5/5 | 1/5 |
| 4 | 5/5 | 4/5 | 0/5 |
| 1 | 1/5 | 1/5 | 0/5 |
| 0.25 | 0/5 | 0/5 | 0/5 |
| Estimated relative activity | 1 | 1 | <0.25 |

It can be seen from these results that 9-amino-7-chloro-6-demethyltetracycline is equal in potency in vivo to tetracycline against *Staphylococus aureus* strain Smith.

The following two tables further demonstrate the in vivo activity of 9-amino-7-chloro-6-demethyltetracycline and 7-chloro-6-demethyl-9-nitrotetracycline.

Table III illustrates the in vivo activity of orally administered 9-amino-7-chloro-6-demethyltetracycline. The animals used were female mice weighing 20–23 grams. The infection was *Staphylococcus aureus* strain Smith: 0.5 milliliter of a $10^{-2}$ T.S.P. dilution of a five hour blood T.S.P. culture was administered intraperitoneally. Of the non-treated, infected, control mice, 97% died within two days post infection. Treatment was by single oral dose. The drugs were contained in 0.5 ml. of 0.2% aqueous agar, at the levels indicated The animals were dosed either 6 hours before or immediately after infection.

TABLE III.—NUMBER ALIVE/NUMBER TESTED AT 14 DAYS POST INFECTION

| Single oral dose in mg./kg. | Dosed single oral tubing at 0 hours | | Dosed single oral tubing at 6 hours | |
| --- | --- | --- | --- | --- |
| | 9-amino-7-chloro-6-demethyltetracycline | 7-chloro-6-demethyl-9-nitrotetracycline | 9-amino-7-chloro-6-demethyltetracycline | 7-chloro-6-demethyl-9-nitrotetracycline |
| 512 | | 10/10 | 10/10 | 3/10 |
| 256 | 15/15 | 11/15 | 3/10 | 3/10 |
| 128 | 10/10 | 5/10 | 1/10 | 0/10 |
| 64 | 9/15 | 1/15 | 1/10 | 1/10 |
| 32 | 0/10 | 2/10 | 1/10 | 1/10 |
| 16 | 1/15 | 0/5 | 1/10 | 1/10 |

The following table illustrates the in vivo activity of these same two tetracycline against a different infection. The animals were female mice weighing 20–24 grams. The infection was *Escherichia coli*, U.C. 311; 0.1 ml. of a $10^{-3}$ T.S.P. dilution of a five hour T.S.P. culture administered intraperitoneally. Each of the non-treated, infected control mice died within three days post infection. Treatment was by single oral dose. The drugs were contained in 0.5 ml. of 0.2% aqueous agar at the levels indicated. The animals were dosed immediately after infection.

TABLE IV.—NUMBER ALIVE/NUMBER TESTED AT 14 DAYS POST INFECTION

| Single oral Dose in mg./kg. | 9-amino-7-chloro-6-demethyltetracycline | 7-chloro-6-demethyl-9-nitrotetracycline |
| --- | --- | --- |
| 512 | 2/5 | 2/5 |
| 256 | 3/5 | 0/5 |
| 128 | 0/5 | 0/5 |

The tetracyclines produced by the novel process of this invention are amphoteric compounds and hence acid addition salts, that is both the mono and di salts may be readily prepared. The preferred acids are the non-toxic pharmaceutically acceptable acids, e.g., the mineral acids such as hydrochloric, sulfuric, phosphoric and the like although organic acids such as trichloroacetic may also be used. The acid addition salts may be prepared by treating the compounds with approximately one equivalent of the chosen acid in a suitable solvent. Additionally, amine salts, e.g., the ethylenediamine salt of these compounds may be prepared in a standard manner.

The invention will be described in greater detail in conjunction with the following specific examples.

EXAMPLE I

Nitration of 7-chloro-6-demethyltetracycline to yield 7-chloro-6-demethyl-9-nitrotetracycline A 20 gram portion of 7-chloro-6-demethyltetracycline was dissolved in 50 ml. of dimethylformamide. This solution was added slowly to a mixture of 400 ml. of 96% sulfuric acid and 20 ml. of water cooled to $-30°$ C. Then a solution of 4.35 grams of potassium nitrate in 20 ml. of 96% sulfuric acid was added dropwise to the antibiotic solution while the temperature was maintained at $-30°$ C. After the addition was completed, the reaction mixture was held at $-30°$ C. for 15 minutes and then poured slowly into 2 kilograms of chopped ice. The solution was extracted with four 500 ml. volumes of n-butanol. The pooled butanol extract was adjusted to pH 0.5 with aqueous ammonium hydroxide. The resultant aqueous phase was discarded and the n-butanol phase was washed with 200 ml. of water. The washed butanol extract was then vacuum concentrated to a small volume. The product was collected, washed with ethyl ether and then dried to yield 7-chloro-6-demethyl-9-nitrotetracycline. The product was then crystallized from warm 2-ethoxyethanol and n-butanol.

EXAMPLE II

Conversion of 7-chloro-6-demethyl-9-nitrotetracycline to 9-amino-7-chloro-6-demethyltetracycline 7-chloro-6-demethyl-9-nitrotetracycline sulfate of Example I was converted to the neutral form by dissolving it in 12 volumes of water and adjusting the pH to 3.5 with ammonium hydroxide, whereupon the neutral compound precipitated. A 1 gram portion of this 7-chloro-6-demethyl-9-nitrotetracycline neutral was dissolved in 25 ml. of methanol containing 0.5 ml. of triethylamine. Low pressure catalytic hydrogenation in the presence of 0.1 gram of 5% rhodium on carbon catalyst resulted in the rapid absorption of 3 moles of hydrogen. After ½ to 1 hour the reaction was terminated and the catalyst was filtered off. The filtrate was diluted with 5 ml. of n-butanol and vacuum-concentrated to a small volume. The resultant slurry was diluted with 10 ml. of ethyl ether and filtered. The material was washed with ether and dried, yielding 0.75 gram of the desired product.

EXAMPLE III

Conversion of 7-chloro-6-demethyl-9-nitrotetracycline to 9-amino-6-demethyltetracycline A 1 gram portion of 7-chloro-6-demethyl-9-nitrotetracycline neutral was dissolved in 25 ml. of methanol containing 0.5 ml. of triethylamine. Low pressure catalytic hydrogenation in the presence of 1 gram of 50% wet 5% palladium on carbon catalyst for 2½ hours resulted in the consumption of 4 moles of hydrogen. The catalyst was filtered off and the filtrate diluted with 5 ml. of butanol. The solution was vacuum-concentrated to a small volume. The resultant slurry was diluted with 10 ml. of ether and filtered. The solids were washed with ether and dried, yielding 0.8 gram of the desired product.

What is claimed is:

1. The method of preparing a compound of the formula:

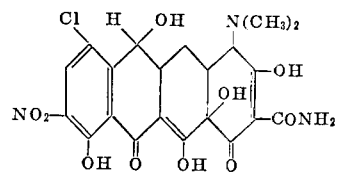

which comprises subjecting 7-chloro-6-demethyltetracycline in an organic solvent to the action of a mixture of concentrated sulfuric acid and an inorganic compound which is water-soluble and which in water ionizes to form nitrate ions and monovalent cations at a temperature not higher than −30° C.

2. The method according to claim 1 in which the source of nitrate ions is potassium nitrate.

References Cited

UNITED STATES PATENTS 3,165,551 1/1965 Blackwood et al. ____ 260—559
3,239,499 3/1966 Rennhard et al. ____ 260—559

FOREIGN PATENTS 243,095 10/1959 Australia.

ALEX MAZEL, *Primary Examiner.*

ANNE MARIE TIGHE, *Assistant Examiner.*

U.S. Cl. X.R.

260—688